3,230,137
CONTROL OF SLIME IN PAPER-MAKING USING ULTRA-VIOLET IRRADIATED SILVER FLUORIDE
Hal J. Ellison, Chicago, Ill., assignor to Silaco Chemical Company, Chicago, Ill., a partnership
No Drawing. Filed Mar. 22, 1961, Ser. No. 97,429
4 Claims. (Cl. 162—161)

This invention, in general, relates to biocide compositions utilizing as a biocide ultra-violet-irradiated silver fluoride and to uses of ultra-violet-irradiated silver fluoride in the destruction of many kinds of microorganisms.

There are many kinds of microorganisms, some of which are pathogens and cause illnesses or malfunctioning in humans, as well as animals, others of which attack or are detrimental to vegetation, still others of which create problems in many industrial processes, and others of which form molds, spores, growths or the like undesirable effects on many types of surfaces. This invention has as its primary objective the provision of biocide compositions which are toxic toward many types of microorganisms. Another object is to provide biocides which are toxic toward many types of microorganisms. Another object is to provide biocides which are toxic to microorganisms at dosage levels below the toxic level for humans. Still another object of the invention is to provide improvements in industrial processes and products of many diverse types through the utilization of ultra-violet-irradiated silver fluoride as a biocide.

Specific uses of the ultra-violet-irradiated silver fluoride biocides of this invention are as a slimicide in the control of microorganism-caused slime in aqueous mediums such as paper stock, paperboard stock, etc.; as a biocide for pathogens and other microbes in food or beverage containers or packages and food or drink processing equipment; as a bactericide in oil-base or water-base paints; as an ingredient of wood preservatives; as a biocide in films and other shaped articles made from synthetic resins such as polyethylene, polyvinyl chloride, polyacrylic acid, polymethacrylic acid lower alkanol esters of said polymer acids, cellulosic polymers such as regenerated viscose, regenerated cuprammonium cellulose, cellulose esters, e.g., methyl cellulose or ethyl cellulose, cellulose ethers, polyvinylidene chloride, polystyrene, polyacrylamide, polyacrylonitrile, etc., as well as copolymers of the vinyl monomers of the aforesaid polyvinyl-type polymers; as a sterilant for bandages of various types, and in other areas which will be suggested to the skilled artisan by this disclosure.

One of the aspects of the invention is a new biocide composition which contains, as an active biocide, ultra-violet-irradiated silver fluoride. Ultra-violet-irradiated silver fluoride is very effective at low dosages in destroying a broad range of microbes. The ultra-violet-irradiation of the silver fluoride has been found to significantly increase its microbe killing power as compared with ultra-violet unirradiated silver fluoride, although the latter is also an effective biocide. Generally speaking, however, the non-irradiated silver fluoride must be used at higher dosages or concentrations to obtain an equivalent microbe kill on an equal time basis.

As an example, the irradiated silver fluoride at 4 p.p.m. concentration in an aqueous medium is 90% or better effective in 15 minutes against common slime-causing microorganisms while the non-irradiated silver fluoride is only about 47% effective against the same organisms in the same time and at the same concentration. Against *Escherichia coli,* the irradiated silver fluoride gives about 94% kill in 15 minutes.

One convenient way to manufacture the ultra-violet-irradiated silver fluoride biocides of the invention is to irradiate a solution of silver fluoride with ultra-violet rays from ultra-violet lamps. The silver fluoride solutions are prepared at the desired concentration, optimally at about 1–10% by weight AgF, and irradiate with ultra-violet light at an intensity and for a sufficient time to produce an irradiated solution having a killing power toward a microbe or class of microbes which is greater than the equivalent quantity of non-irradiated silver fluoride. As a general rule of thumb, the microbe killing power of silver fluoride is significantly enhanced by subjecting a silver fluoride aqueous solution to ultra-violet-irradiation with rays which are at least about 95% in the ultra-violet spectrum for at least about 6–7 minutes for each gallon of silver fluoride solution into which the ultra-violet rays penetrate. Longer periods of irradiation are not harmful. Where the ultra-violet intensity of the rays is substantially less than that stated above, longer periods of irradiation usually are required to obtain optimum biocide properties in the irradiated solution.

During irradiation, there usually is formed in the silver fluoride solution a small of insoluble substances believed to be, at least in part, colloidal silver. This insoluble material has microbe killing power and it, accordingly, is desirable to keep the insoluble material in solution. For this purpose, it is desirable to add to the silver fluoride solution a water-soluble or water-dispersible dispersant or protective colloid for the insolubles to keep them in suspension. Examples of said dispersants or protective colloids are casein, gelatin, carboxy methyl cellulose, methyl cellulose, amylopectin, pectates, water-soluble gums such as gum arabic, gum tragancanth, etc., and various alginates. They ordinarily are employed in the silver fluoride at concentrations in the range of about 0.5 to 5% by weight.

The following examples constitute some of the preferred embodiments of the generic invention herein disclosed.

*Example 1*

A silver fluoride solution containing about 4.8% AgF by weight and about 1% by weight of casein is irradiated with rays consisting of 95+% ultra-violet rays penetrating each gallon of the solution for 6–7 minutes. The microbe killing power of the irradiated solution toward common slime-producing organisms at 1–4 p.p.m. concentration of the the irradiate silver fluoride is about double that of an equivalent concentration of non-irradiated silver fluoride.

*Example 2*

A silver fluoride solution containing about 4.8% AgF by weight and about 1% by weight of gelatin is irradiated with rays consisting of 95+% ultra-violet rays penetrating each gallon of the solution for 6–7 minutes. The microbe killing power is substantially the same as the irradiated solution of Example 1.

The above-described ultra-violet-irradiated solutions of silver fluoride have many biocidal uses. Similarly, non-irradiated silver fluoride solutions ranging in concentrations from about 0.5–65% can be employed instead.

These solutions can be added to or proportioned into aqueous systems and therein diluted to provide the desired biocide concentration. The irradiated silver fluoride solutions can be used with effectiveness at concentrations as low as about 0.5 p.p.m. AgF. The upper limit of concentration may be as desired, even up to 10 or 15% by weight as AgF, though these high concentrations are rarely needed. The same holds true for the non-irradiated silver fluoride, although it is generally preferred to use at least about 1 p.p.m. AgF in this instance because of the lesser killing power of non-irradiated silver fluoride.

Where a product is produced in a process in which the silver fluoride, irradiated or non-irradiated, is added as a biocide and the product is to come in contact with foods, sores or cuts in the body, the mouth, ears, eyes, etc., the concentration of the silver fluoride in or on the surface of the product, especially the latter, should be at a low level. It has been found that in such instances a concentration of AgF not exceeding about 4 p.p.m. is a safe, non-toxic level with respect to humans who ingest or come into contact with these products. This also applies to food or beverage processing equipment wherein the residual amount of the silver fluoride left after sterilization of the equipment should be very small. This can be accomplished by sterilizing the equipment with a silver fluoride solution of the invention at a concentration in the range of about 0.5 to 10 p.p.m., preferably not more than about 4 p.p.m.

As a germicide in paints or coating compositions of the oil base or water base types, the concentration of the silver fluoride may be relatively high, if desired. While low concentrations in the range of about 1-20 p.p.m. by weight of the liquid paint or coating are effective in controlling germ growth on the dry paint surface, the concentration of the silver fluoride in the liquid paint can be much higher for special paints which are used in applications where a substantially completely microbe-free surface is important. In such cases, the concentration of the silver fluoride, irradiated or non-irradiated, may be as high as about 2.0%. The aqueous biocide compositions may be incorporated into oil base paints by emulsifying the aqueous solutions in the oil base during or after the formulation of the paint by techniques known in the paint industry.

The silver fluoride biocides of the invention may also be used in plastics of the aforementioned type to control or eliminate microbe growth of the surfaces of the plastic articles. It ordinarily is used in amounts in the range of about 0.1 to 1% by weight of the plastic when incorporated in the plastic, fused mass prior to formation of the plastic article. In some cases, it can be sprayed on the surface of the plastic article as a solution of the silver fluoride.

In the sterilization of bandages, the aqueous sterilant solutions in which the bandage material is soaked or which is sprayed or otherwise applied to the bandage material preferably is one having a silver fluoride concentration of about 0.5 to 4 p.p.m. by weight. At this level, the quantity of silver fluoride is kept within the range which is safe for humans.

The silver fluoride solutions of the invention may be used as wood preservatives in place of or in combination with known preservatives such as the mercurials or polyhalogenated phenols, which includes polychlorinated phenols such as pentachlorophenol. In these instances, the concentration of the silver fluoride in the liquid wood preservative may range from low values, e.g., about 0.5% by weight of the liquid preservative, up to high levels in the range of 10-15% by weight. In addition to being effective against microorganisms, the silver fluoride in the wood preservatives is also toxic toward microorganisms such as termites and other wood-boring species. The wood may be impregnated with the preservative in the form of an aqueous solution of the silver fluoride or in the form of a water-in-oil emulsion wherein the dispersed phases are the aqueous solution of silver fluoride (irradiated or non-irradiated) and the continuous phase is toluene, xylene, naphthenes, or other liquid hydrocarbon.

In slime control in aqueous systems, such as paper stock, water-cooling towers, stagnant water ponds or pools, the concentration of the silver fluoride is maintained at about 0.5 p.p.m. up to as high as about 50-100 p.p.m. by weight, depending on the aqueous system and the severity of the slime problem. Where the system serves as a source of drinking water for humans or animals, low concentrations are essential, i.e., above 0.5-4 p.p.m. Where the aqueous system is an aqueous fibrous stock such as paper stock or paperboard stock, again the maximum concentration of silver fluoride depends on ultimate use of the paper, paperboard or other fibrous product. Where the fibrous product comes into direct contact with food or beverage, the optimum concentration is about 0.5 to 4 p.p.m. AgF by weight of the aqueous stock. With other types of paper, the AgF may be as high as 100 p.p.m. by weight, again based on the aqueous stock.

Another way of applying the silver fluoride to fibrous products such as paper is by spraying the silver fluoride solution on the fibrous product to provide the desired quantity of silver fluoride in the produced paper.

The following are examples of applications of the biocides disclosed generically herein.

*Example 3*

Food wrapping paper is produced by a conventional paper producing process on a Fourdrinier machine, and to the aqueous paper pulp stock is added the composition of Example 1 to provide a concentration of silver fluoride of 3 p.p.m., based on the weight of the paper stock. Slime is effectively controlled. The concentration of the irradiated AgF composition, as AgF, in the aqueous stock is carefully controlled so that it does not exceed 0.024 pound per ton of produced paper—thereby assuring a paper product which safely can be in direct contact with food to be eaten by humans.

*Example 4*

Paperboard designated to be used in the production of a food or beverage package, wherein the food or beverage is to be in direct contact with the paperboard, is produced on a cylinder paper-making machine, and to the aqueous paperboard wood pulp stock is added the composition of Example 1 in an amount sufficient to provide a silver fluoride composition of 2 p.p.m., based on the weight of the paperboard stock. Slime-producing microorganisms are controlled effectively by the biocide. The concentration of the irradiated AgF composition, as AgF, in the aqueous stock is carefully controlled so that it does not exceed 0.024 pound per ton of produced paper—thereby assuring a paper product which safely can be in direct contact with food to be eaten by humans.

Where the paper or paperboard is not one which will be in direct contact with foods or beverages, concentrations of the silver fluoride greater than the 0.024 pound per ton of produced paper may be employed. Only in most cases, however, it is not necessary to exceed this value for effective slime control in the pulp stocks.

*Example 5*

An alkyd resin paint is prepared by standard production procedures, and an aqueous solution containing silver fluoride (5% by weight AgF) is emulsified into the product during its manufacture in an amount sufficient to provide a concentration of silver fluoride, based on the weight of the solids in the paint formulation, of about 1.5-2.0%.

*Example 6*

A water base paint, e.g., casein paint or an emulsion type paint such as an acrylic emulsion (Roplex AC-33), a commercial styrene-butadiene latex paint, a polyvinyl acetate latex paint, or the like, has dissolved in the aqueous phase 1% by weight, based on the solids in the paint composition, of ultra-violet-irradiated silver fluoride, which is irradiated in a manner similar to Example 1.

*Example 7*

Wood is impregnated with the composition of Example 1 to provide a concentration of the irradiated solids, as AgF, of about 1%, based on the dry wood solids, when the impregnated wood is dry.

Example 8

Gauze used in the manufacture of bandage products is soaked in a solution of 3–4 p.p.m. of irradiated silver fluoride prepared by diluting with sterile water the composition of Example 1. The gauze is then steamed and dried in sterile equipment to produce sterilized bandage.

Example 9

The pasteurizing vats used to pasteurize beer are cleaned and then sterilized with a solution diluted with water to 2 p.p.m., as AgF, of the irradiated silver fluoride composition of Example 1.

Example 10

A thermoplastic polymer film of any of the afore-described polymers has incorporated therein 0.5%–1.0% by weight of silver fluoride to provide a film resistant to the growth of aerobic microbes on the surface thereof.

It will be seen from the foregoing description and examples that the non-irradiated and irradiated silver fluoride biocides have a broad range of microbe killing power and a broad range of uses in industry. Among the general classes of microbes against which these biocides are effective are the spore-forming bacteria, the non-spore-forming bacteria, yeasts, and molds. These biocides are effective against the *coli* bacteria family of which coliform is a member, against *Aerobacter aerogenes*, against *Aspergillus niger*, against *Penicillium expanceum*, and many others.

It will be seen from the foregoing description that this invention provides novel features, advantages, and characteristics applicable in a wide variety of ultimate uses and accomplishes its intended objectives, including those hereinbefore specified and others which are inherent in the invention.

The invention is hereby claimed as follows:

1. Paper pulp stock containing as a slime control agent 0.5 to 100 p.p.m., based on the weight of said stock, of ultra-violet-irradiated silver fluoride in admixture with a small amount of colloidal silver produced by said ultra-violet irradiation, said ultra-violet irradiated silver fluoride being produced by the irradiation of an aqueous solution of silver fluoride with irradiation rays which are at least about 95% in the ultra-violet spectrum for at least about six minutes per gallon of the ultra-violet irradiated, aqueous silver fluoride solution to obtain said admixture.

2. Paper containing in the fibrous structure a small amount, not exceeding 0.024 pound per ton of paper, of ultra-violet-irradiated silver fluoride in admixture with a small amount of colloidal silver produced by said ultra-violet irradiation, said ultra-violet irradiated silver fluoride being produced by the irradiation of an aqueous solution of silver fluoride with irradiation rays which are at least about 95% in the ultra-violet spectrum for at least about six minutes per gallon of the ultra-violet irradiated, aqueous silver fluoride solution to obtain said admixture.

3. In a process for producing paper and paperboard, the improvement which comprises adding to an aqueous pulp stock to control slime formation therein 0.5 to 100 p.p.m., based on the weight of said aqueous stock, ultra-violet-irradiated silver fluoride in admixture with a small amount of colloidal silver produced by said ultra-violet irradiation, said ultra-violet irradiated silver fluoride being produced by the irradiation of an aqueous solution of silver fluoride with irradiation rays which are at least about 95% in the ultra-violet spectrum for at least about six minutes per gallon of the ultra-violet irradiated, aqueous silver fluoride solution to obtain said admixture.

4. The process of claim 3 wherein the amount of said ultra-violet-irradiated silver fluoride added to said pump stock does not exceed 0.024 pound per ton of produced paper.

References Cited by the Examiner

UNITED STATES PATENTS

| | | | |
|---|---|---|---|
| 2,235,843 | 3/1941 | Muller | 210—64 |
| 2,459,896 | 1/1949 | Schwarz | 162—161 |
| 2,614,060 | 10/1952 | Rogers | 167—14 |
| 2,816,057 | 12/1957 | Cook | 167—38.5 |
| 2,818,344 | 12/1957 | Buckman | 106—15 |
| 2,853,449 | 9/1958 | Moudry. | |
| 2,902,400 | 9/1959 | Moudry | 167—14 |
| 2,919,200 | 12/1959 | Dubin | 106—15 |
| 2,922,736 | 1/1960 | Spalding | 162—161 |
| 2,922,737 | 1/1960 | Moudry | 167—14 |
| 2,927,052 | 3/1960 | Moudry | 167—14 |
| 2,928,717 | 3/1960 | Eberl | 21—58 |
| 3,006,807 | 10/1961 | Legator | 162—161 |
| 3,035,968 | 5/1962 | Degoli | 167—14 |
| 3,068,064 | 12/1962 | McDonald | 210—58 |
| 3,092,552 | 6/1963 | Romans | 162—161 |

OTHER REFERENCES

Reddish, Antiseptics, Disinfectants, Fungicides and Sterilization, 2nd Ed., 1957 (461).

"Federal Register," vol. 26, p. 352, Jan. 18, 1961.

Merck Index, 5th Ed., 1940, p. 499.

DONALL H. SYLVESTER, *Primary Examiner.*

WILLIAM B. KNIGHT, MORRIS O. WOLK,
*Examiners.*

J. LEVITT, S. L. BASHORE, *Assistant Examiners.*